(12) United States Patent
Chang

(10) Patent No.: US 9,104,061 B2
(45) Date of Patent: Aug. 11, 2015

(54) COLOR FILTER SUBSTRATE AND TOUCH SCREEN DISPLAY DEVICE

(71) Applicant: Innolux Corporation, Miao-Li County (TW)

(72) Inventor: Chih-Kuei Chang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 141 days.

(21) Appl. No.: 13/845,167

(22) Filed: Mar. 18, 2013

(65) Prior Publication Data

US 2013/0293790 A1 Nov. 7, 2013

(30) Foreign Application Priority Data

May 3, 2012 (TW) .............................. 101115782 A

(51) Int. Cl.
*G02F 1/13* (2006.01)
*G02F 1/1335* (2006.01)

(52) U.S. Cl.
CPC .... *G02F 1/133514* (2013.01); *G02F 1/133512* (2013.01)

(58) Field of Classification Search
CPC ......................... G02F 1/13454; G02F 1/13452
USPC ........................................... 349/12, 149–152
See application file for complete search history.

(56) References Cited

U.S. PATENT DOCUMENTS

| 6,143,450 A | 11/2000 | Sobue et al. |
|---|---|---|
| 8,052,498 B2 | 11/2011 | Chien et al. |
| 2001/0022637 A1* | 9/2001 | Yu .................................. 349/102 |
| 2008/0062139 A1* | 3/2008 | Hotelling et al. ............. 345/173 |
| 2010/0134725 A1* | 6/2010 | Yoon et al. ...................... 349/96 |

FOREIGN PATENT DOCUMENTS

| CN | 102221928 A | 10/2011 |
|---|---|---|
| TW | 201022784 A | 6/2010 |

OTHER PUBLICATIONS

English Abstract translation of CN102221928 (Published Oct. 19, 2011).
TW Search Report dated May 16, 2014.
English translation of TW Search Report dated May 16, 2014.

* cited by examiner

*Primary Examiner* — Phu Vu
(74) *Attorney, Agent, or Firm* — McClure, Qualey & Rodack, LLP

(57) ABSTRACT

A color filter substrate includes: a transparent substrate; a plurality of color filters which are separately disposed on the transparent substrate; a black matrix unit made of a non-transparent material and formed on the transparent substrate, the black matrix encircling the color filters; and at least one alignment unit that includes at least two alignment holes penetrating the black matrix to expose the transparent substrate.

8 Claims, 7 Drawing Sheets

COLOR FILTER SUBSTRATE AND TOUCH SCREEN DISPLAY DEVICE

This application claims priority of Taiwanese application no. 101115782, filed on May 3, 2012.

BACKGROUND OF THE INVENTION

1. Field of the Invention

This invention relates to a color filter substrate and a touch screen display device, more particularly to a color filter substrate for a display device integrated with a touch screen, and the display device integrated with a touch screen.

2. Description of the Related Art

A touch screen display device is a combination of a touch panel and a display device.

FIGS. 1 and 2 show a conventional liquid crystal display device with a capacitive touch screen, in which FIG. 2 is a fragmentary view taken along line II-II in FIG. 1. The liquid crystal display device includes: a touch panel 11, a liquid crystal display panel 12, a flexible circuit board 13 electrically connected to a control circuit (not shown), and a touch screen display region 14. The touch panel 11 has a transparent substrate 111, a touch sensor 112 formed on a surface of the transparent substrate 111, and a protective layer 113 covering the touch sensor 112. The touch screen display region 14 corresponds in position to the touch sensor 112. The liquid crystal display panel 12 includes a TFT (thin film transistor) substrate 121, a color filter substrate 122, and a liquid crystal layer 123 disposed between the TFT substrate 121 and the color filter substrate 122. The flexible circuit board 13 is electrically connected to the touch sensor 112 and the control circuit. When the touch screen display region 14 is pressed, the capacitance of the touch sensor 112 will change, thereby generating a touch signal. The touch signal is then transmitted to the control circuit through the flexible circuit board 13.

In the conventional liquid crystal display device, the touch panel 11 is adhered to a surface of the color filter substrate 122 of the liquid crystal display panel using an adhesive (not shown). However, with miniaturization of 3C products, reducing the thickness and weight of the touch screen display device has become a subject of endeavor in the industry, in which a liquid crystal display device integrated with a touch panel has been the target of development in recent years.

FIG. 3 shows a conventional touch panel-integrated liquid crystal display device 2. The major difference between the conventional touch panel-integrated liquid crystal display device 2 shown in FIG. 3 and the liquid crystal display device 1 of FIG. 1 resides in that, in the touch panel-integrated liquid crystal display device 2, the transparent substrate 111 used in the liquid crystal display device 1 of FIG. 1 is omitted and the touch sensor 112 is directly formed on the surface of the color filter substrate 122 so that the color filter substrate 122 also serves as the transparent substrate of the touch panel 11, thereby resulting in a reduction in the thickness and weight of the touch panel-integrated liquid crystal display device 2.

However, alignment of the flexible circuit board 13 with the touch sensor 112 in the liquid crystal display device of FIG. 1 is conducted using an optical alignment device that is disposed on the transparent substrate 111 so as to align and electrically connect the flexible circuit board 13 and the touch sensor 112. Since, in the liquid crystal display device of FIG. 1, the flexible circuit board 13 is connected to the transparent substrate 111, light generated from the optical alignment device may penetrate through the transparent substrate 111 without being obstructed. However, in the conventional touch panel-integrated liquid crystal display device 2 shown in FIG. 3, the transparent substrate is dispensed with and the flexible circuit board 13 is directly connected to a periphery of the surface of the color filter substrate 122. Since the periphery of the surface of the color filter substrate 122 to which the flexible circuit board 13 is connected is formed with a black matrix 124 that is used to isolate color filters and that is non-transmissible for light, may not be used a conventional optical alignment device to achieve alignment between the flexible circuit board 13 and the touch sensor 112.

The current alignment method is usually conducted to align the flexible circuit board 13 with the touch sensor 112 by virtue of an alignment pattern or through adjusting the position of a light source (illuminating toward front side or rear side of the transparent substrate 111). Since the black matrix 124 is non-transmissible for light, the alignment pattern will not be formed at the black matrix. However, the aforesaid alignment method cannot meet the requirement for mass production of the touch panel-integrated liquid crystal display device. Accordingly, how to seek an effective and precise alignment method is the subject of endeavor in the development of a liquid crystal display device integrated with the touch panel.

SUMMARY OF THE INVENTION

Therefore, an object of the present invention is to provide a color filter substrate for a touch panel-integrated liquid crystal display device.

Moreover, another object of the present invention is to provide a touch screen display device.

Accordingly, a color filter substrate of this invention includes:

a transparent substrate having a first surface;

a plurality of color filters which are separately disposed on the first surface of the transparent substrate;

a black matrix made of a non-transparent material and formed on the first surface of the transparent substrate, the black matrix encircling the color filters; and at least one alignment unit that includes at least two alignment holes penetrating the black matrix to expose the transparent substrate.

A touch screen display device of this invention includes:

a liquid crystal display panel including a color filter substrate that includes a transparent substrate, a plurality of color filters, a black matrix, and at least one alignment unit, the transparent substrate having a first surface and a second surface opposite to the first surface, the color filters being separately disposed on the first surface, the black matrix being made of a non-transparent material and being formed on the first surface to encircle the color filters, the alignment unit including at least two alignment holes penetrating the black matrix to expose the transparent substrate;

a touch sensor formed on the second surface of the transparent substrate, and at least one flexible circuit board formed on and connected to the second surface, and electrically connected to the touch sensor, the flexible circuit board including at least two alignment patterns each of which is aligned with a respective one of the alignment holes.

By virtue of formation of the light-transmissible alignment holes in the black matrix of the color filter substrate, alignment and connection of the flexible circuit board and the touch sensor can be performed through the alignment holes using an optical detection device. Thus, the connection of the flexible circuit board and the touch sensor can be achieved precisely without modifying the conventional optical detection device.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
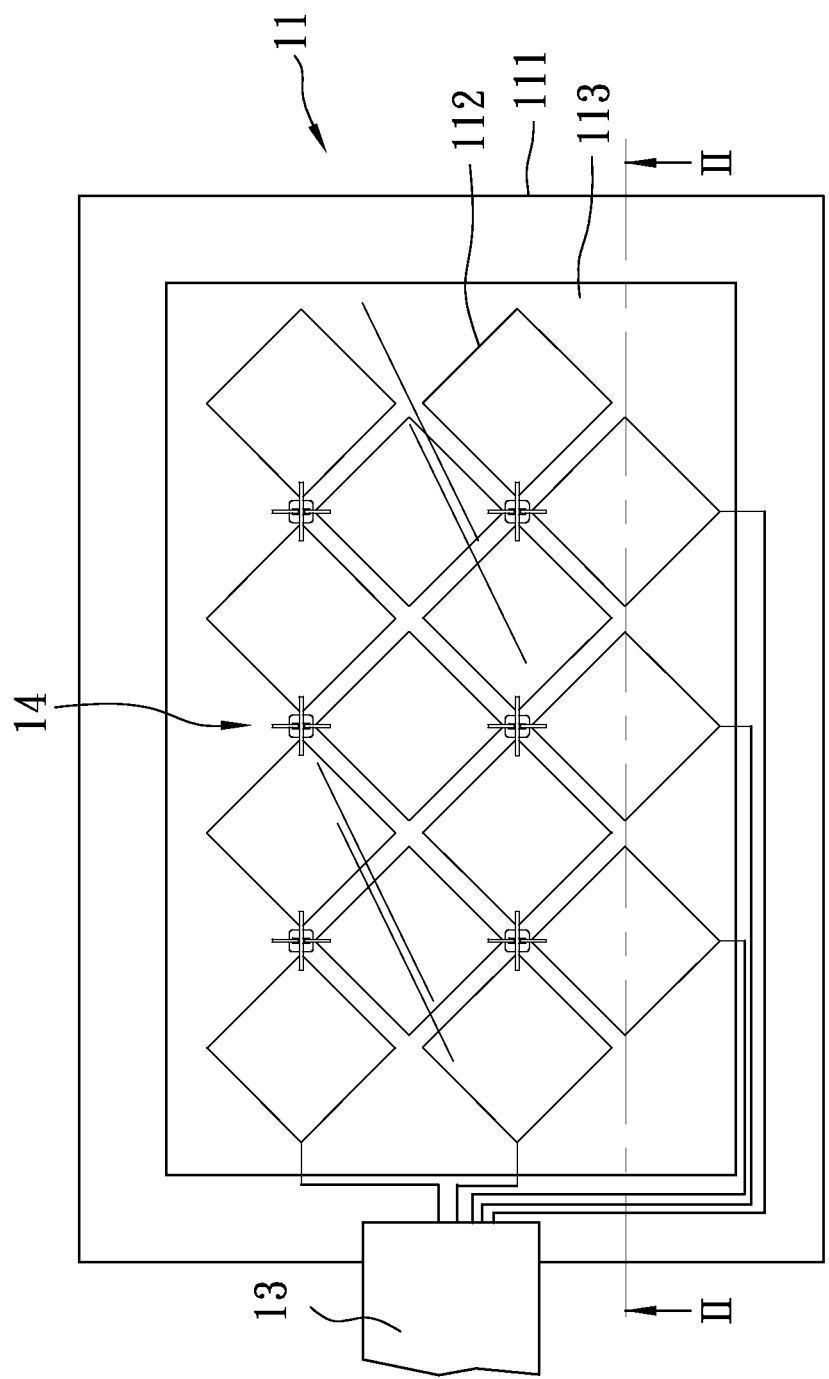
FIG. 1 is a top view of a conventional liquid crystal display device with a capacitive touch screen.
Figure 2:
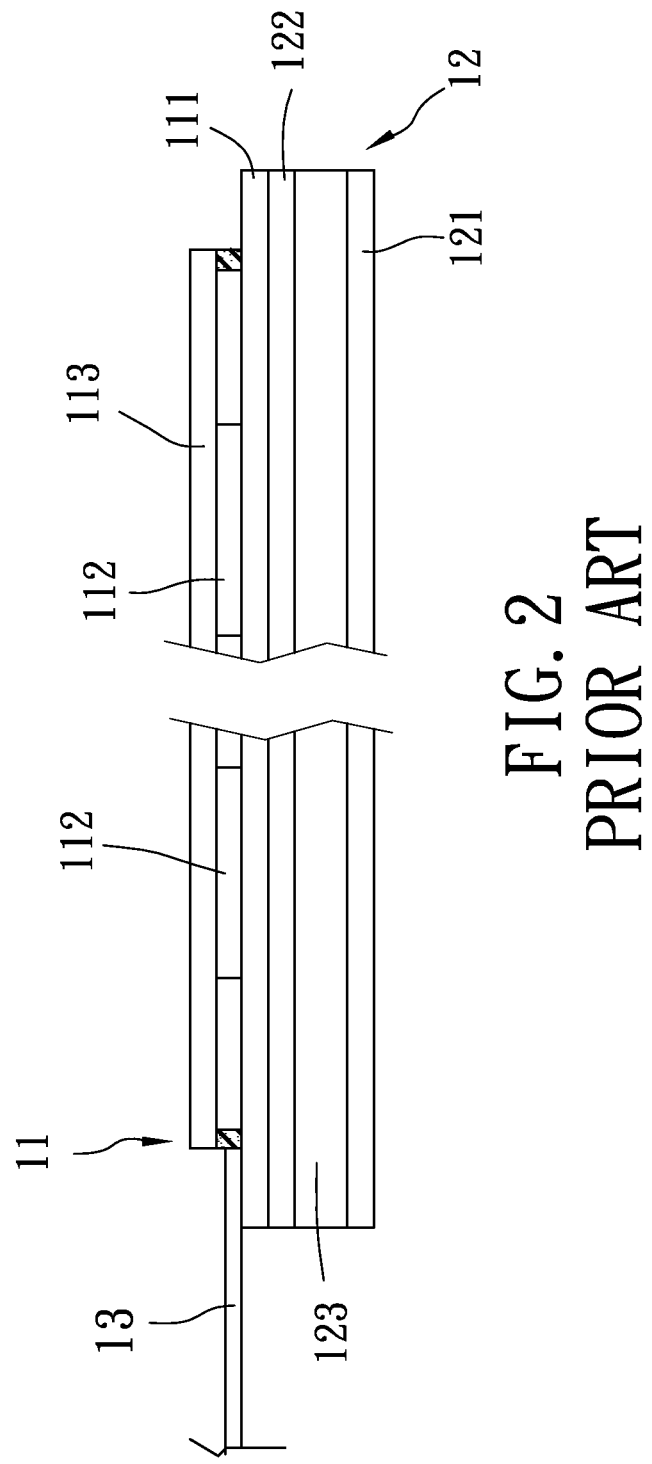
FIG. 2 is a fragmentary view of the conventional liquid crystal display device shown in FIG. 1.
Figure 3:
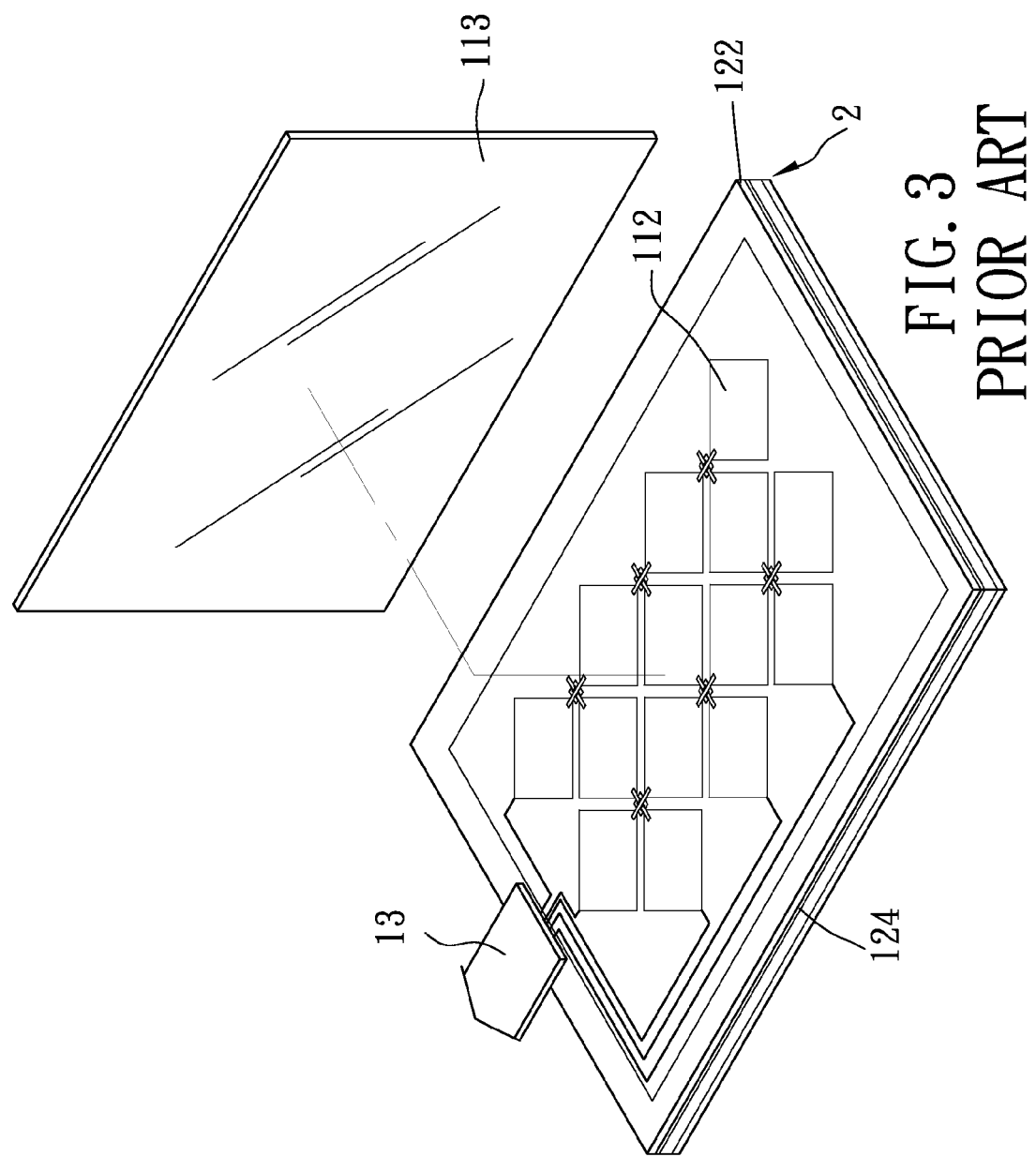
FIG. 3 is a perspective view of a conventional touch panel-integrated liquid crystal display device.
Figure 4:
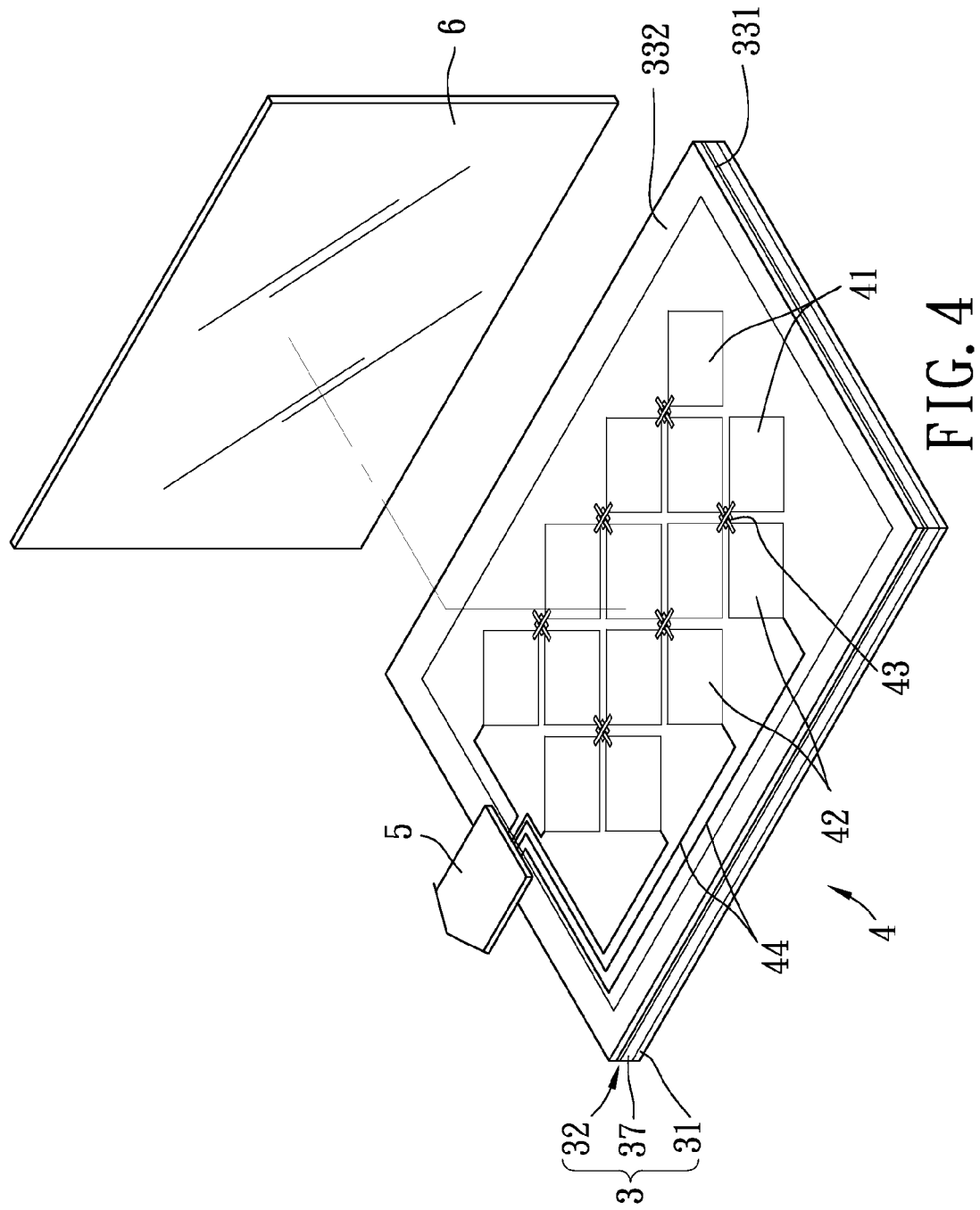
FIG. 4 is a perspective view of the preferred embodiment of a touch screen display device according to this invention.
Figure 5:
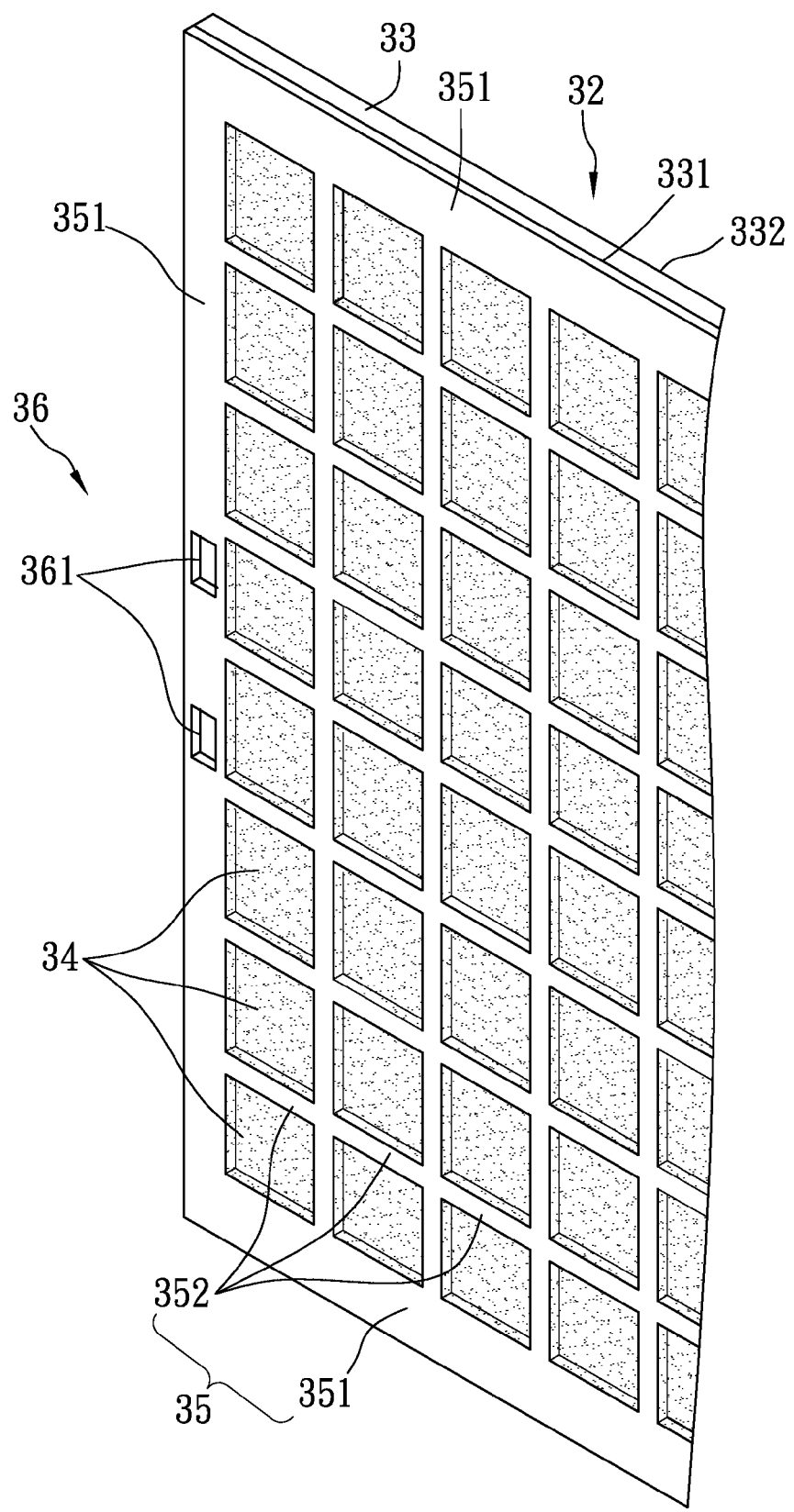
FIG. 5 is a fragmentary perspective view of a color filter substrate of the preferred embodiment shown in FIG. 4.
Figure 6:
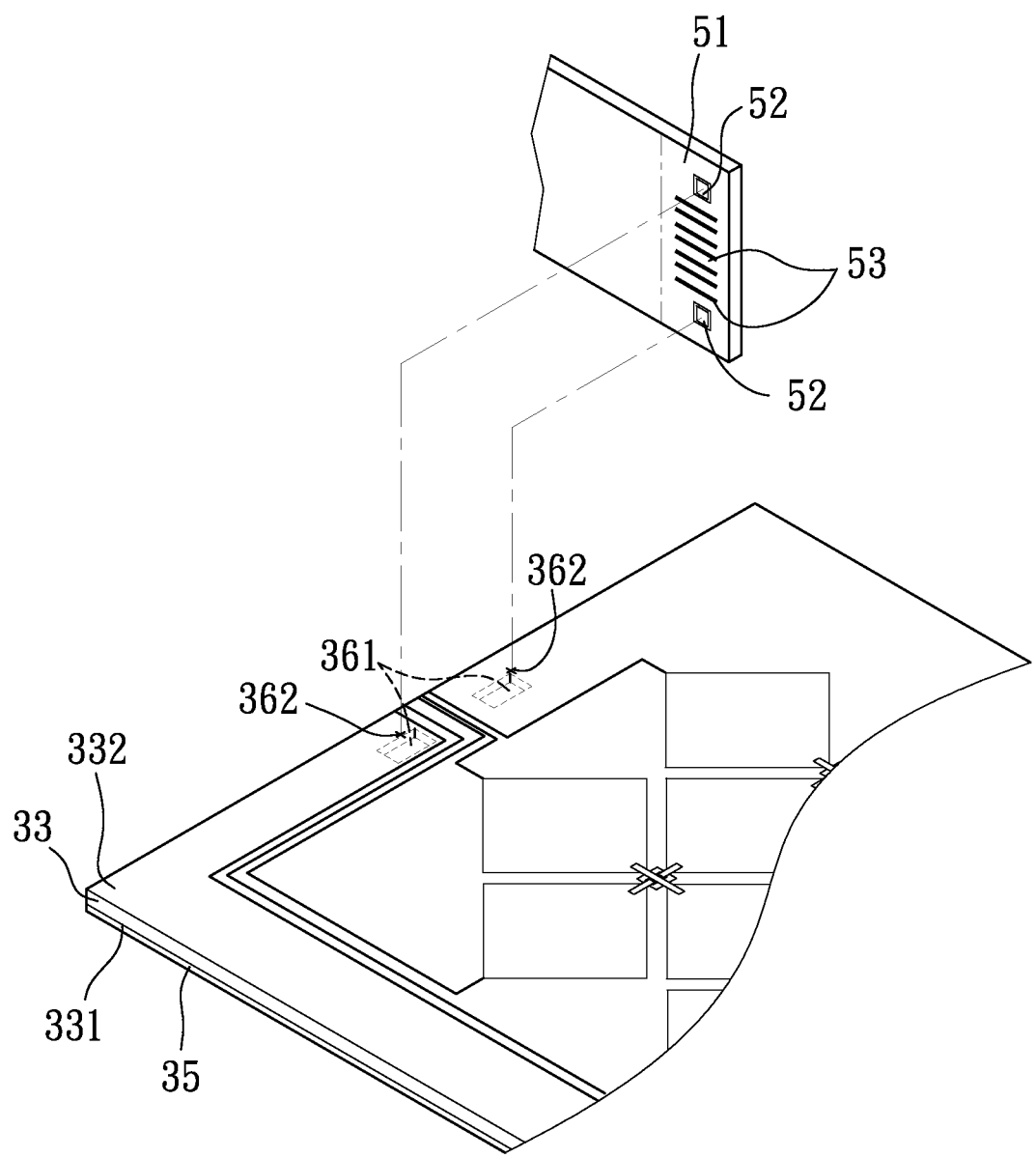
FIG. 6 is a fragmentary exploded perspective view illustrating relative position between a flexible circuit board and an alignment unit of the preferred embodiment shown in FIG. 4.

Referring to FIGS. 4 to 6, the preferred embodiment of a touch screen display device according to this invention comprises: a liquid crystal display panel 3, a touch sensor 4, a flexible circuit board 5, and a protective layer 6 covering the touch sensor 4.

The liquid crystal display panel 3 has a thin film transistor substrate 31, a color filter substrate 32, and liquid crystal molecules 37 disposed between the thin film transistor substrate 31 and the color filter substrate 32. Because the structure of the liquid crystal display panel 3 of this invention is generally similar to that of a conventional liquid crystal display panel, a detailed description thereof is omitted herein for the sake of brevity. The liquid crystal display panel 3 according to this invention differs from the conventional one in that the color filter substrate 32 of this invention has at least one alignment unit 36. The detailed structure of the color filter substrate 32 is further described as follows. The color filter substrate 32 includes a transparent substrate 33, a plurality of color filters 34, a black matrix 35, and at least one alignment unit 36. In this preferred embodiment, only one alignment unit 36 is used for explanation.

The transparent substrate 33 is made from a transparent material such as glass or quartz glass, and has a first surface 331 adjacent to the liquid crystal molecules 37, and a second surface 332 opposite to the first surface 331.

The color filters 34 are composed of RGB three primary color pixels, and are distributed in an array on the first surface 331.

The black matrix 35 is made of a non-transparent material, and has a frame region 351 and a plurality of strip regions 352. The frame region 351 is formed on the first surface 331 and encircles the color filters 34. The strip regions 352 are intersected on the first surface 331 to isolate the color filters 34. The black matrix 35 is composed of a material such as a black photosensitive resin or chromium, and the color filters 34 encircled by the frame region 351 cooperatively define a display region. The materials and manufacturing methods for the color filters 34 and the black matrix 35 are well known to a skilled artisan and thus are not detailed herein for the sake of brevity.

The alignment unit 36 has two alignment holes 361, and two alignment marks 362 formed on the second surface 332 and corresponding in position to the two alignment holes 361. The two alignment holes 361 are formed in the frame region 351, and are arranged along a longitudinal direction of the frame region 351.

It is noted that a pattern for the alignment holes 361 can be simultaneously formed on a pre-prepared photomask for the black matrix 35 through pattern design of the photomask so that the alignment holes 361 and the black matrix 35 can be formed at the same time.

The touch sensor 4 is formed on the second surface 332 of the color filter substrate 32, and can be a resistive or capacitive type. In the preferred embodiment of this invention, the capacitive touch sensor is used for illustration.

Specifically, the touch sensor 4 has a plurality of first electrode circuits 41 that are separately formed on the second surface 332 and that form a horizontal conductive passage in a horizontal direction transverse to the longitudinal direction, a plurality of second electrode circuits 42 that are separately formed on the second surface 332 and that form a vertical conductive passage in the longitudinal direction, a plurality of electrode pads 43 disposed among the adjacent first and second electrode circuits 41, 42, and a plurality of conductive wires 44 extending from the first and second electrode circuits 41 and 42.

The flexible circuit board 5 has one side connected to the second surface 332 and electrically connected to the conductive wires 44 of the touch sensor 4, and the other side electrically connected to a control circuit (not shown).

The protective layer 6 is made of an electrical insulating material, and covers and protects the touch sensor 4.

When the touch sensor 4 is pressed, capacitance value of the touch sensor 4 will vary, so as to generate a touch signal that is transmitted to the control circuit through the flexible circuit board 5.

Figure 7:
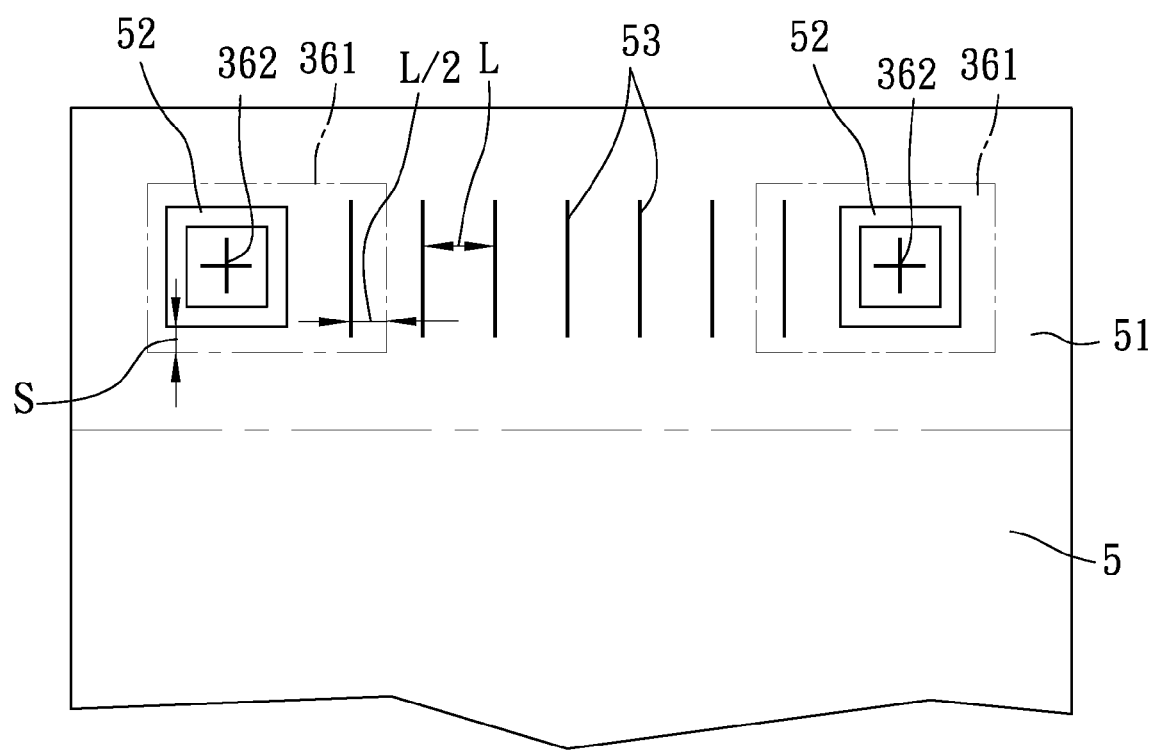
FIG. 7 is a fragmentary schematic view illustrating relative position of the alignment unit and alignment patterns of the flexible circuit board of the preferred embodiment shown in FIG. 4.

Referring to FIGS. 6 and 7, specifically, the flexible circuit board 5 has a connecting region 51 connected to the second surface 332, two alignment patterns 52 formed on the connecting region 51, and a plurality of conductive wires 53 disposed between the two alignment patterns 52. Two adjacent ones of the conductive wires 53 are spaced apart from each other by a minimum distance (L). The two alignment patterns 52 are respectively aligned with the two alignment holes 361 of the alignment unit 36. The conductive wires 53 are electrically connected to the conductive wires 44. In the preferred embodiment, each of the alignment patterns 52 is a square pattern having a predetermined width, and is capable of encircling a respective one of the alignment marks 362 that corresponds in position to a respective one of the alignment patterns 52. The square patterns 52 are light-transmissible.

To achieve better sensitivity of an optical detection device upon detection, the alignment holes 361 respectively have a size larger than an area of the alignment patterns 52 of the flexible circuit board 5. Each of the alignment holes 361 is defined by an edge. The shortest distance (S) between the edge and the respective alignment pattern 52 is not smaller than 30 μm. Preferably, for a better alignment between the conductive wire 53 of the flexible circuit board 5 and the conductive wires 44, each of the two alignment holes 361 has a size sufficient to expose the respective one of the alignment patterns 52 and at least one the conductive wires 53 adjacent to the respective one of the alignment patterns 52. The shortest distance between the edge of the alignment holes 361 and the exposed conductive wires 53 is larger than or equal to (L/2).

In the touch screen display device according to this invention, the color filter substrate 32 is used as a substrate for the touch sensor 4, thereby reducing thickness of the touch screen display device. Moreover, by virtue of the alignment holes 361 formed in the black matrix 35, electrical connection between the flexible circuit board 5 and the touch sensor 4 can be performed using the optical detection device without modifying a conventional alignment process or device. Thus, the design of the alignment unit 36 is more suitable for mass production of a touch panel-integrated liquid crystal display device, i.e., the touch screen display device of this invention.

While the present invention has been described in connection with what is considered the most practical and preferred embodiment, it is understood that this invention is not limited to the disclosed embodiments but is intended to cover various arrangements included within the spirit and scope of the broadest interpretations and equivalent arrangements.

What is claimed is:

1. A color filter substrate, comprising:
   a transparent substrate having a first surface;
   a plurality of color filters which are separately disposed on said first surface of said transparent substrate; a black matrix made of a non-transparent material and formed on said first surface of said transparent substrate, said black matrix encircling said color filters; and
   at least one alignment unit that includes at least two alignment holes penetrating said black matrix to expose said transparent substrate,
   wherein said transparent substrate further has a second surface opposite to said first surface, said color filter substrate further comprising a touch sensor formed on said second surface;
   wherein said color filter substrate further comprises at least one flexible circuit board electrically connected to said touch sensor; and wherein said flexible circuit board includes a connecting region connected to said second surface, and at least two alignment patterns formed on said connecting region, each of said two alignment patterns being aligned with a respective one of said two alignment holes of said alignment unit, said alignment holes having an area larger than that of said alignment patterns.

2. The color filter substrate of claim 1, wherein said alignment unit further includes two alignment marks that are formed on said second surface, and each of said alignment marks corresponds in position to a respective one of said alignment holes.

3. The color filter substrate of claim 1, wherein each of said alignment holes is defined by an edge, a shortest distance between said edge of each of said alignment holes and the respective one of said alignment patterns being not smaller than 30 μm.

4. The color filter substrate of claim 1, wherein said flexible circuit board further includes a plurality of conductive wires electrically connected to said touch sensor, each of said alignment holes having a size sufficient to expose exposing the respective one of said alignment patterns and at least one of said conductive wires adjacent to the respective one of said alignment patterns.

5. A touch screen display device, comprising:
   a liquid crystal display panel including a color filter substrate that includes a transparent substrate, a plurality of color filters, a black matrix, and at least one alignment unit, said transparent substrate having a first surface and a second surface opposite to said first surface, said color filters being separately disposed on said first surface, said black matrix being made of a non-transparent material and being formed on said first surface to encircle said color filters, said alignment unit including at least two alignment holes penetrating said black matrix to expose said transparent substrate;
   a touch sensor formed on said second surface; and
   at least one flexible circuit board formed on and connected to said second surface, and electrically connected to said touch sensor, said flexible circuit board including at least two alignment patterns each of which is aligned with a respective one of said alignment holes.

6. The touch screen display device as claimed in claim 5, wherein said flexible circuit board includes a connecting region for connecting to said second surface, and a plurality of conductive wires, said two alignment patterns being disposed on two opposite ends of said connecting region, said conductive wires being electrically connected with said touch sensor, each of said alignment holes having a size sufficient to expose the respective one of said alignment patterns and at least one of said conductive wires adjacent to the respective one of said alignment patterns.

7. The touch screen display device as claimed in claim 6, wherein each of said alignment holes is defined by an edge, a shortest distance between said edge of each of said alignment holes and the respective one of said alignment patterns being not smaller than 30 μm.

8. The touch screen display device as claimed in claim 5, wherein said touch sensor is one of a capacitive touch sensor and a resistive touch sensor.

\* \* \* \* \*